United States Patent
Xian et al.

(10) Patent No.: US 11,056,116 B2
(45) Date of Patent: Jul. 6, 2021

(54) LOW LATENCY NEARBY GROUP TRANSLATION

(71) Applicant: Google LLC, Mountain View, CA (US)

(72) Inventors: Shijing Xian, Sunnyvale, CA (US); Deric Cheng, Bedford, TX (US)

(73) Assignee: GOOGLE LLC, Mountain View, CA (US)

( * ) Notice: Subject to any disclaimer, the term of this patent is extended or adjusted under 35 U.S.C. 154(b) by 9 days.

(21) Appl. No.: 16/611,135

(22) PCT Filed: Apr. 11, 2018

(86) PCT No.: PCT/US2018/027183
§ 371 (c)(1),
(2) Date: Nov. 5, 2019

(87) PCT Pub. No.: WO2019/199306
PCT Pub. Date: Oct. 17, 2019

(65) Prior Publication Data
US 2020/0194000 A1     Jun. 18, 2020

(51) Int. Cl.
*G10L 15/30* (2013.01)
*G10L 13/08* (2013.01)
(Continued)

(52) U.S. Cl.
CPC ............ *G10L 15/30* (2013.01); *G10L 13/086* (2013.01); *G10L 15/005* (2013.01); *G10L 15/26* (2013.01); *G10L 2015/227* (2013.01)

(58) Field of Classification Search
CPC ................................ G10L 15/26; G10L 15/30
(Continued)

(56) References Cited

U.S. PATENT DOCUMENTS 9,098,494 B2 * 8/2015 Sarikaya ................. G06F 40/58
10,552,546 B2 * 2/2020 Nelson .................. H04M 3/567
(Continued)

OTHER PUBLICATIONS

European Patent Office; Communication Pursuant to Article 94(3) EPC issue in Application of Ser. No. 18722301; 6 pages; dated Sep. 17, 2020.
(Continued)

*Primary Examiner* — Susan I McFadden
(74) *Attorney, Agent, or Firm* — Middleton Reutlinger

(57) ABSTRACT

Local wireless networking is used to establish a multi-language translation group between users that speak more than two different languages such that when one user speaks into his or her computing device, that user's computing device may perform automated speech recognition, and in some instances, translation to a different language, to generate non-audio data for communication to the computing devices of other users in the group. The other users' computing devices then generate spoken audio outputs suitable for their respective users using the received non-audio data. The generation of the spoken audio outputs on the other users' computing devices may also include performing a translation, thereby enabling each user to receive spoken audio output in their desired language in response to speech input from another user, and irrespective of the original language of the speech input.

20 Claims, 6 Drawing Sheets

(51) Int. Cl.
G10L 15/00 (2013.01)
G10L 15/26 (2006.01)
*G10L 15/22* (2006.01)

(58) Field of Classification Search
USPC ......................................................... 704/277
See application file for complete search history.

(56) References Cited

U.S. PATENT DOCUMENTS

| | | | |
|---|---|---|---|
| 10,553,208 B2* | 2/2020 | Nelson | G06N 5/04 |
| 10,757,148 B2* | 8/2020 | Nelson | G06F 40/58 |
| 2009/0099836 A1 | 4/2009 | Jacobsen et al. | |
| 2012/0122577 A1 | 5/2012 | Aronzon | |
| 2012/0284014 A1 | 11/2012 | Zivkovic | |
| 2013/0238312 A1 | 9/2013 | Waibel | |
| 2017/0371868 A1 | 12/2017 | Zhang et al. | |

OTHER PUBLICATIONS

European Patent Office; International Search Report and Written Opinion of Ser. No. PCT/US2018/027183; 19 pages; dated Jun. 28, 2018.

European Patent Office; Communication Pursuant to Article 94(3) EPC issue in Application of Ser. No. 18722301; 7 pages; dated Feb. 5, 2021.

\* cited by examiner

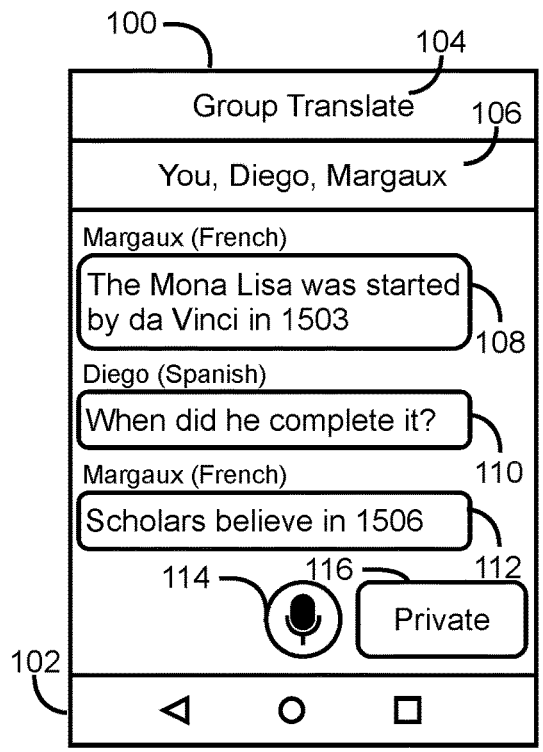
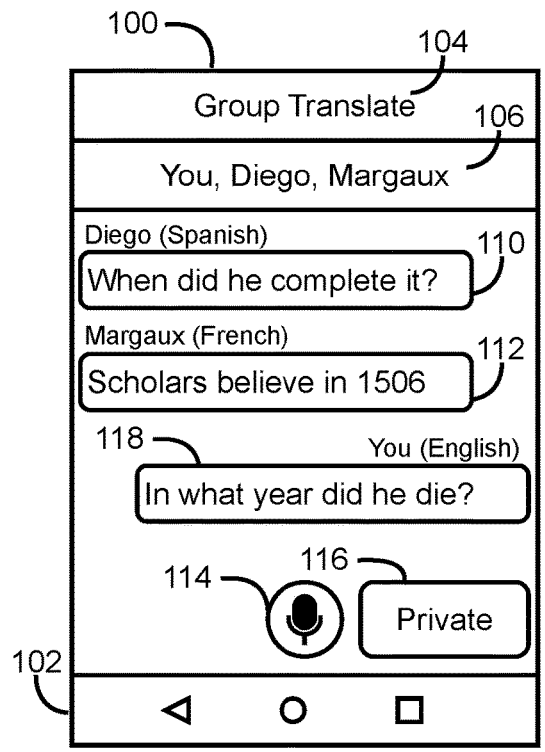
FIG. 3A                FIG. 3B
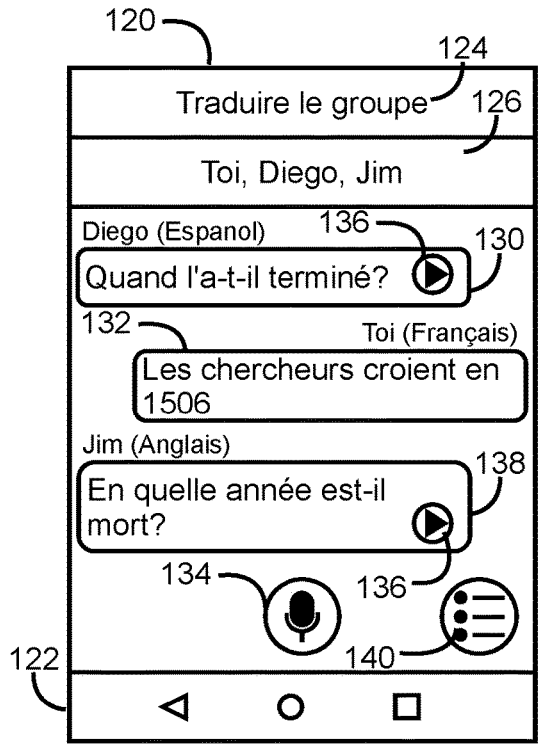
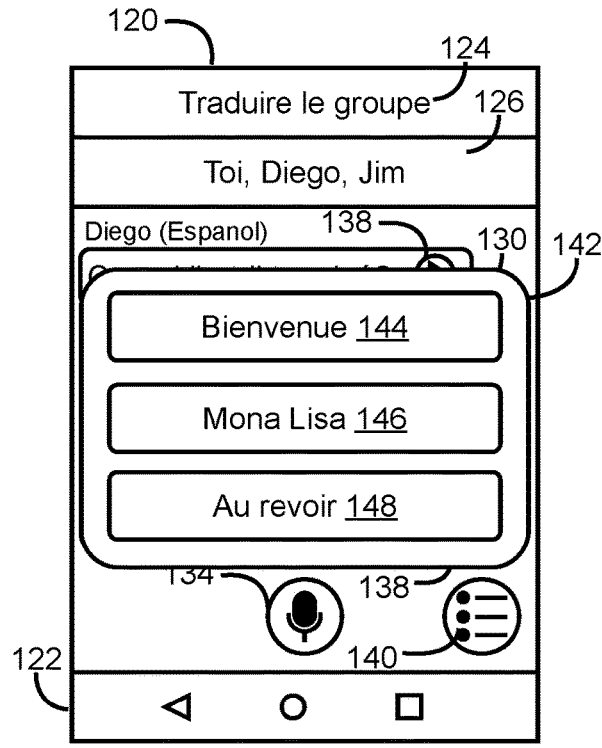
FIG. 3C                FIG. 3D

LOW LATENCY NEARBY GROUP TRANSLATION

BACKGROUND

Real time translation is generally used to enable people who speak different languages engage in a conversation. Real time translation, in this regard, refers to translation that is performed substantially concurrently with a conversation, and desirably with minimal latency between the time when one person speaks an utterance in one language and the time at which another user is provided with a textual or spoken representation of that utterance in another language. In many instances, translation between languages is performed by an online service that receives an audio stream of a speaker's voice from a listener's device (e.g., as captured by the microphone of a listener's mobile device), performs a translation into the listener's desired language, and then returns either an audio stream of the translated utterance, or alternatively, a textual representation of the translated utterance, for playback and/or display on the listener's device. It has been found, however, that translation may be desired in many instances where online connectivity is limited or non-existent, particularly when audio is captured and played back on mobile devices.

Furthermore, in many instances users are required to explicitly designate the "from" and "to" languages with which to perform translations. However, there are a number of circumstances where groups of people speaking more than two languages are attempting to converse with one another, which can result in additional difficulties associated with selecting and switching between the correct languages between which to perform translations. As an example, when a tour guide is leading a group of people from many different countries, even if a particular person has selected the native language of the tour guide with which to perform translations, other people in the group may ask questions in various different languages that the person may not understand.

SUMMARY

The present disclosure is generally directed to methods, apparatus, and computer-readable media (transitory and non-transitory) that utilize local wireless networking to establish a multi-language translation group between three or more users that speak different languages such that when one user speaks into their respective computing device (e.g., a mobile device), that user's computing device may perform automated speech recognition, and in some instances, translation to a different language, to generate non-audio data (e.g., text data) that can then be communicated to the computing devices of other users in the multi-language translation group. The other users' computing devices, in turn, may then generate spoken audio outputs suitable for their respective users using the non-audio data communicated to the other users' computing devices. The generation of the spoken audio outputs on the other users' computing devices may also include performing translations into the desired languages for the respective users, thereby enabling each user to receive spoken audio output in their desired language in response to speech input from another user, irrespective of the original language of the speech input.

Therefore, consistent with some implementations, a method of group translation may include, in a first computing device of a first user and configured to output spoken audio in a first language, joining a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, and in the first computing device, and in response to a speech input in the second language received at the second computing device and directed to the multi-language translation group receiving non-audio data associated with the speech input, and generating a spoken audio output in the first language and directed to the first user from the non-audio data associated with the speech input.

Some implementations may further include, in the third computing device and in response to the speech input in the second language received at the second computing device and directed to the multi-language translation group receiving the non-audio data associated with the speech input, and generating a second spoken audio output in the third language and directed to the third user from the non-audio data associated with the speech input. Some implementations may also include, in the second computing device receiving the speech input, performing automated speech recognition on the speech input to generate the non-audio data associated with the speech input, and sending the non-audio data associated with the speech input to the first and third computing devices via the multi-language translation group. In addition, some implementations may also include, in the second computing device receiving the speech input, performing automated speech recognition on the speech input and locally translating an output of the automated speech recognition from the second language to a different language to generate the non-audio data associated with the speech input, and sending non-audio data associated with the speech input to the first and third computing devices via the multi-language translation group.

In addition, in some implementations, generating the spoken audio output in the first computing device includes locally translating the non-audio data associated with the speech input to the first language. Some implementations may also include, in the first computing device receiving a second speech input from the first user, performing automated speech recognition on the second speech input to generate second non-audio data associated with the second speech input, and sending the second non-audio data associated with the second speech input to the second and third computing devices via the multi-language translation group. Some implementations may further include, in the first computing device receiving a second speech input from the first user, performing automated speech recognition on the second speech input and locally translating an output of the automated speech recognition from the first language to a different language to generate second non-audio data associated with the second speech input, and sending the second non-audio data associated with the second speech input to the second and third computing devices via the multi-language translation group.

Moreover, in some implementations, the non-audio data associated with the speech input includes text data associated with the speech input. In addition, in some implementations, the non-audio data associated with the speech input includes one or more feature vectors associated with the speech input. Further, in some implementations, the local wireless network connection includes a Bluetooth connection, a personal area network connection, a wireless mesh network connection, a near field connection (NFC), or a wireless local area network (WLAN) connection. In addition, in some implementations, the local wireless connection uses a first wireless network, where joining the multi-language translation group is performed over the first wireless network and receiving the non-audio data associated with the speech input is performed over a second wireless network.

Some implementations may also include, in the first computing device, relaying the non-audio data associated with the speech input and received from the second computing device to the third computing device. Also, in some implementations, the non-audio data associated with the speech input is received in a broadcast message generated by the second computing device. Further, in some implementations, the non-audio data associated with the speech input is received in a point-to-point message generated by the second computing device and addressed to the first computing device.

In addition, some implementations may further include initiating the multi-language translation group by broadcasting an announcement message from one of the first and second computing devices, and receiving, at the one of the first and second computing devices, a response to the announcement message from the other of the first and second computing devices. In some implementations, the first computing device includes a mobile device, and joining the multi-language translation group, receiving the non-audio data associated with the speech input and generating the spoken audio output are performed by an app resident on the mobile device. Moreover, in some implementations, the first computing device further includes a wireless headphone in wireless communication with the mobile device, and the method further includes playing back the spoken audio output over the wireless headphone. In some implementations, the app generates a chat room display on a display of the mobile device, and the method further includes displaying a textual representation of the spoken audio output in the first language in the chat room display.

In addition, in some implementations, the speech input is a prestored message selected by the second user. Also, in some implementations, the speech input is a message generated by a virtual assistant.

Consistent with some implementations, a method of group translation may include, in a first computing device of a first user and configured to output spoken audio in a first language, joining a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, and in the first computing device receiving a speech input in the first language from the first user, performing automated speech recognition on the speech input to generate speech recognition data, and generating non-audio data associated with the speech input using the speech recognition data, and sending the non-audio data associated with the speech input to the second and third computing devices via the multi-language translation group to cause the second and third computing devices to respectively generate respective spoken audio outputs in the second and third languages and respectively directed to the second and third users.

In some implementations, generating the non-audio data associated with the speech input includes locally translating the speech recognition data to a different language from the first language. In addition, in some implementations, generating the non-audio data associated with the speech input includes locally translating the speech recognition data to each of the second and third languages. Moreover, in some implementations, the non-audio data associated with the speech input includes text data associated with the speech input or one or more feature vectors associated with the speech input. Further, in some implementations, sending the non-audio data associated with the speech input includes sending a broadcast message to the second and third computing devices.

In some implementations, sending the non-audio data associated with the speech input includes sending separate messages respectively addressed to the second and third computing devices. Some implementations may also include initiating the multi-language translation group by broadcasting an announcement message from one of the first and second computing devices, and receiving, at the one of the first and second computing devices, a response to the announcement message from the other of the first and second computing devices. In some implementations, the first computing device includes a mobile device, and joining the multi-language translation group, performing automated speech recognition on the speech input, and generating the non-audio data associated with the speech input are performed by an app resident on the mobile device. Moreover, in some implementations, the app generates a chat room display on a display of the mobile device, and the method further includes displaying a textual representation of the spoken audio output in the first language in the chat room display.

Consistent with some implementations, a first computing device may be configured to output spoken audio in a first language to a first user and include one or more processors and memory operably coupled with the one or more processors, and the memory may store instructions that, in response to execution of the instructions by the one or more processors, cause the one or more processors to join a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, and in response to a speech input in the second language received at the second computing device and directed to the multi-language translation group receive non-audio data associated with the speech input, and generate a spoken audio output in the first language and directed to the first user from the non-audio data associated with the speech input.

In some implementations, the first computing device includes a mobile device, and the instructions define a plurality of software components, the plurality of software components including a local translation component configured to generate text in the first language from the non-audio data associated with the speech input, and a text to speech component configured to generate the spoken audio output from the text generated by the local translation component. Further, in some implementations, the plurality of software components further includes a multi-language group translation app in communication with each of the local translation component and the text to speech component, an automated speech recognition component in communication with the multi-language group translation app and configured to recognize spoken input, and a chat room component in communication with the multi-language group translation app and configured to generate a chat room display on a display of the mobile device, and to display a textual representation of the spoken audio output in the first language in the chat room display. Moreover, in some implementations, the plurality of software components further includes a networking component configured to establish and maintain a wireless network connection with the second computing device.

Consistent with some implementations, a first computing device may be configured to output spoken audio in a first language to a first user and may include one or more processors and memory operably coupled with the one or more processors, where the memory stores instructions that, in response to execution of the instructions by the one or more processors, cause the one or more processors to join a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, receive a speech input in the first language from the first user, perform automated speech recognition on the speech input to generate speech recognition data, generate non-audio data associated with the speech input using the speech recognition data, and send the non-audio data associated with the speech input to the second and third computing devices via the multi-language translation group to cause the second and third computing devices to respectively generate respective spoken audio outputs in the second and third languages and respectively directed to the second and third users.

Consistent with some implementations, at least one non-transitory computer-readable medium includes instructions that, in response to execution of the instructions by one or more processors of a first computing device configured to output spoken audio in a first language to a first user, cause the one or more processors to join a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, and in response to a speech input in the second language received at the second computing device and directed to the multi-language translation group receive non-audio data associated with the speech input, and generate a spoken audio output in the first language and directed to the first user from the non-audio data associated with the speech input.

Consistent with some implementations, at least one non-transitory computer-readable medium includes instructions that, in response to execution of the instructions by one or more processors of a first computing device configured to output spoken audio in a first language to a first user, cause the one or more processors to join a multi-language translation group additionally including second and third users by establishing a local wireless network connection to one or both of a second computing device of the second user and a third computing device of the third user, where the second and third computing devices are respectively configured to output spoken audio in second and third languages, and where the first, second and third languages differ from one another, receive a speech input in the first language from the first user, perform automated speech recognition on the speech input to generate speech recognition data, generate non-audio data associated with the speech input using the speech recognition data, and send the non-audio data associated with the speech input to the second and third computing devices via the multi-language translation group to cause the second and third computing devices to respectively generate respective spoken audio outputs in the second and third languages and respectively directed to the second and third users.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 3A, 3B, 3C, and 3D depict examples of how group member devices may render graphical user interfaces, in accordance with various implementations.

DETAILED DESCRIPTION

In various implementations, low latency nearby group translation is performed to facilitate communication between users speaking three or more languages using associated computing devices of the different users. Low latency nearby group translation in various implementations may establish a multi-language translation group between three or more users, and may support the communication of non-audio data (e.g., text data, feature or embedded vectors, etc.) over a wireless network between computing devices of the users in the group to provide low latency communications between the user computing devices. The computing devices, in turn, may perform local translation to or from respective languages of the users, as well as local automated speech recognition and text-to-speech conversion to convert between audio and non-audio data, to minimize dependency on online connectivity of the computing devices, such that low latency nearby group translation may be utilized in situations where online connectivity is limited or nonexistent. Other variations and modifications will be appreciated from the discussion hereinafter.

Figure 1:
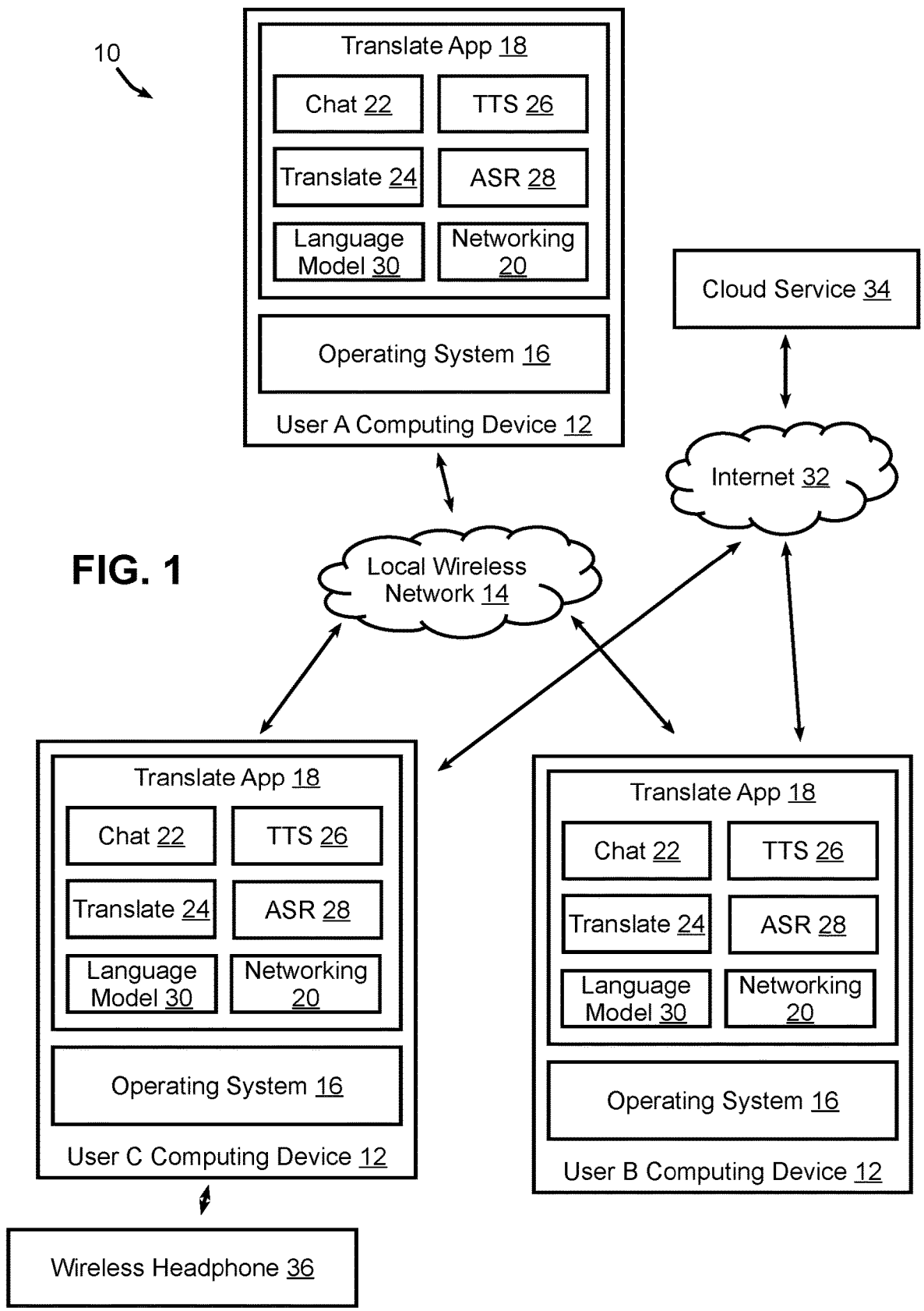
FIG. 1 illustrates an environment in which low latency nearby group translation may be employed, in accordance with various implementations.

FIG. 1 illustrates an example environment 10 in which low latency nearby group translation may be performed in some implementations. The example environment 10 includes a plurality of computing devices 12 coupled to one another over a local wireless network 14. Each computing devices 12 is associated with a particular user (e.g., users A, B and C), and may include various types of computers and other programmable electronic devices, including mobile devices, smartphones, tablets, wearable computers, laptop computers, desktop computers, server computers, controllers, set top boxes, dedicated computing devices and practically any other types of device incorporating one or more processors for executing instructions.

A computing device 12 may be portable or may be mounted or maintained at a fixed location in various implementations. For example, when used as an announcement system in a public area such as an airplane, a train, a bus, an airport, a train or bus station, or when used for a sporting or gaming event or for a conference, speech or presentation, the computing device used by a primary user (e.g., an announcer) may not be portable. In a vehicle such as an airplane, train or bus, for example, a computing device may be hardwired and integrated into or otherwise interfaced with the electronic system of the vehicle. Otherwise, in some implementations, all of computing devices 12 may be portable in nature. In various implementations, the computing devices 12, and the users thereof, are located in the same general vicinity, e.g., in the same general physical location and within the range of one or more local wireless networks to which the computing devices are coupled.

Local wireless network 14 to which each computing device 12 is wirelessly coupled may represent various types of short distance wireless networks, including, for example, a Bluetooth network, a personal area network (PAN), a wireless mesh network, a near field communication (NFC) network, or a wireless local area network (WLAN or Wi-Fi), among others in which connectivity to the network is limited to computing devices that are relatively nearby one another.

Each computing device 12 executes an operating system 16 and various applications, e.g., a group translation application (or app) 18 in which various operations associated with low latency nearby group translation may be performed. Application 18 may additionally include various software components resident therein, including, for example, a networking component 20, a chat or chat room component 22, a translation component 24, a text-to-speech (TTS) component 26, and an automated speech recognition (ASR) component 28. Each component 20-28 may be implemented separately from application 18 in some implementations, e.g., within operating system 16 or in a separate framework, so the invention is not limited to the particular architecture described herein.

Networking component 20 may be used, for example, to establish a network connection with one or more other computing devices 12 over local wireless network 14 and to manage communications over local wireless network 14. As will become more apparent below, networking component 20 in some implementations may initiate or respond to connection requests or announcements, maintain network topology information, and send, receive or acknowledge network communications over local wireless network 14, among other operations. Networking component 20 may also be dedicated to communications over one or more specific network protocols, e.g., Bluetooth Low Energy (BLE) in the illustrated implementation.

Chat component 22 may be used to create and maintain a "chat room" type of user interface for the computing device 12, presenting, for example, a transcript of text communications within a multi-language translation group, and identifying the users or speakers of each communication. Various operations such as initiating communications to the group, initiating private communications to selected members of the group, recording audio, playing audio, etc. may be supported. Other operations utilized in other types of chat rooms (e.g., SMS or text message chat rooms, instant message (IM) chat rooms, etc.) may also be supported by component 22 in some implementations.

Translation component 24 may be used to perform language translations between two or more languages. While in some implementations, translation component 24 may access an online service to perform some or all translations, in the illustrated implementation translation component 24 is a local translation component that performs translation locally on a computing device 12. In this regard, one or more translation models 30 may be resident locally on each computing device 12 in some implementations, and it will be appreciated that translation may be performed irrespective of any online connectivity of a computing device in the illustrated implementation.

Furthermore, in the illustrated implementation, communications between computing devices are all performed in a single common language (e.g., English in some implementations), whereby each translation component 24 is used to perform translations between the single common language and a desired or selected language of the user of a computing device 12. Put another way, each computing device 12 may be configured by its associated user with a primary language, and translation component 24 may be used to translate between this primary language and the common language utilized by the group. In some implementations, the primary language of a computing device may be the same as the single common language used by the group, whereby translation component 24 may not be used or may be omitted entirely. A translation component 24 and associated translation model 30 may also be limited to translating between two languages in some implementations, while in other implementations, a translation component 24 may be coupled to multiple translation models 30 to support translations between more than two languages.

Text-to-speech (TTS) component 26 may be used to convert non-audio data, e.g., text data or feature/embedded vectors, to an audio representation of a spoken utterance or translation thereof. Conversely, automated speech recognition (ASR) component 28 may be used to convert an audio representation of a spoken utterance into non-audio data. In some implementations, ASR component 28 may generate text corresponding to a spoken utterance, while in other implementations, ASR component 28 may generate another form of non-audio data, such as one or more feature/embedded vectors describing the phonemes, words or phrases in a spoken utterance.

It will be appreciated that in some implementations, any of components 20-28 may be combined with one another, or alternatively the functionality of any component 20-28 may be partitioned into multiple components. In addition, as noted above, in the illustrated implementation, none of components 20-28 relies on online connectivity. In other implementations, however, online connectivity, e.g., as supported by local wireless network 14 or by another network (e.g., Internet 32 illustrated in FIG. 1), may be used to provide access to remote information or operations, e.g., via one or more cloud services 34. For example, operations such as translations, speech recognition and/or text-to-speech conversion may be provided by a cloud service 34 in some implementations.

Furthermore, while each computing device 12 may provide integrated audio input and output capabilities (e.g., via integrated microphones and speakers) in some implementations, in other implementations, external audio devices may be used to provide audio input and/or output functionality. In some implementations, for example, a computing device 12 may be coupled to a wireless headphone 36 incorporating an integrated microphone. Other external devices, including wired or wireless devices such as headphones, headsets, earphones, earbuds, microphones, speakers, etc. may also be used in other implementations. In some implementations, for example, wireless headphones, headsets, earbuds or earphones (which will be referred to collectively herein as wireless headphones) may be used. Further, an external audio device may also communicate commands for use by computing device 12, e.g., via a personal assistant (spoken) interface, a button or other hard user input, a touch or gesture sensor, etc.

Other variations will be apparent to those having the benefit of the instant disclosure, and as such, the invention is not limited to the particular environments discussed herein.

Figure 2A:
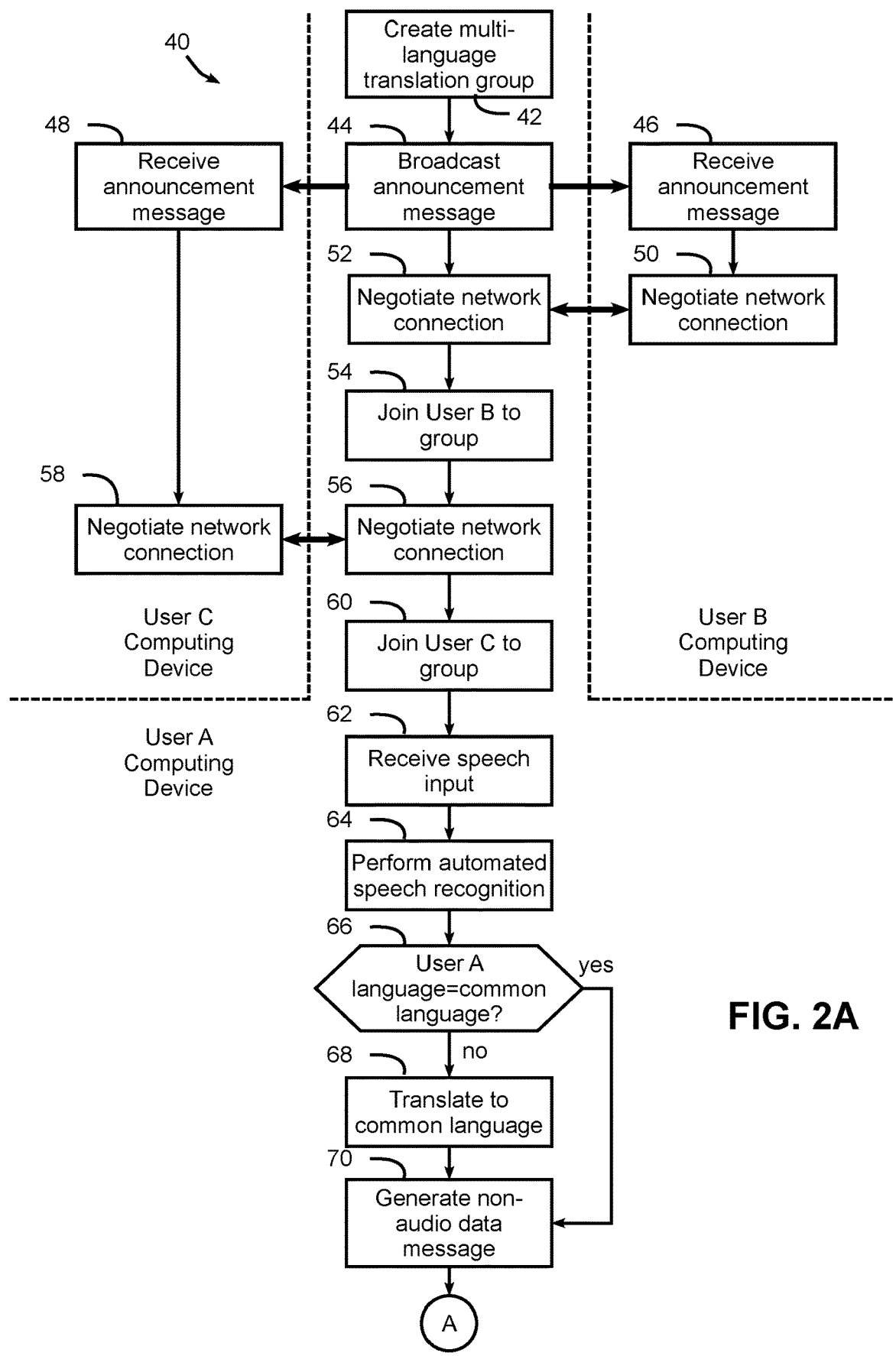
FIGS. 2A and 2B depict a flow chart illustrating an example method in accordance with various implementations.
Figure 2B:
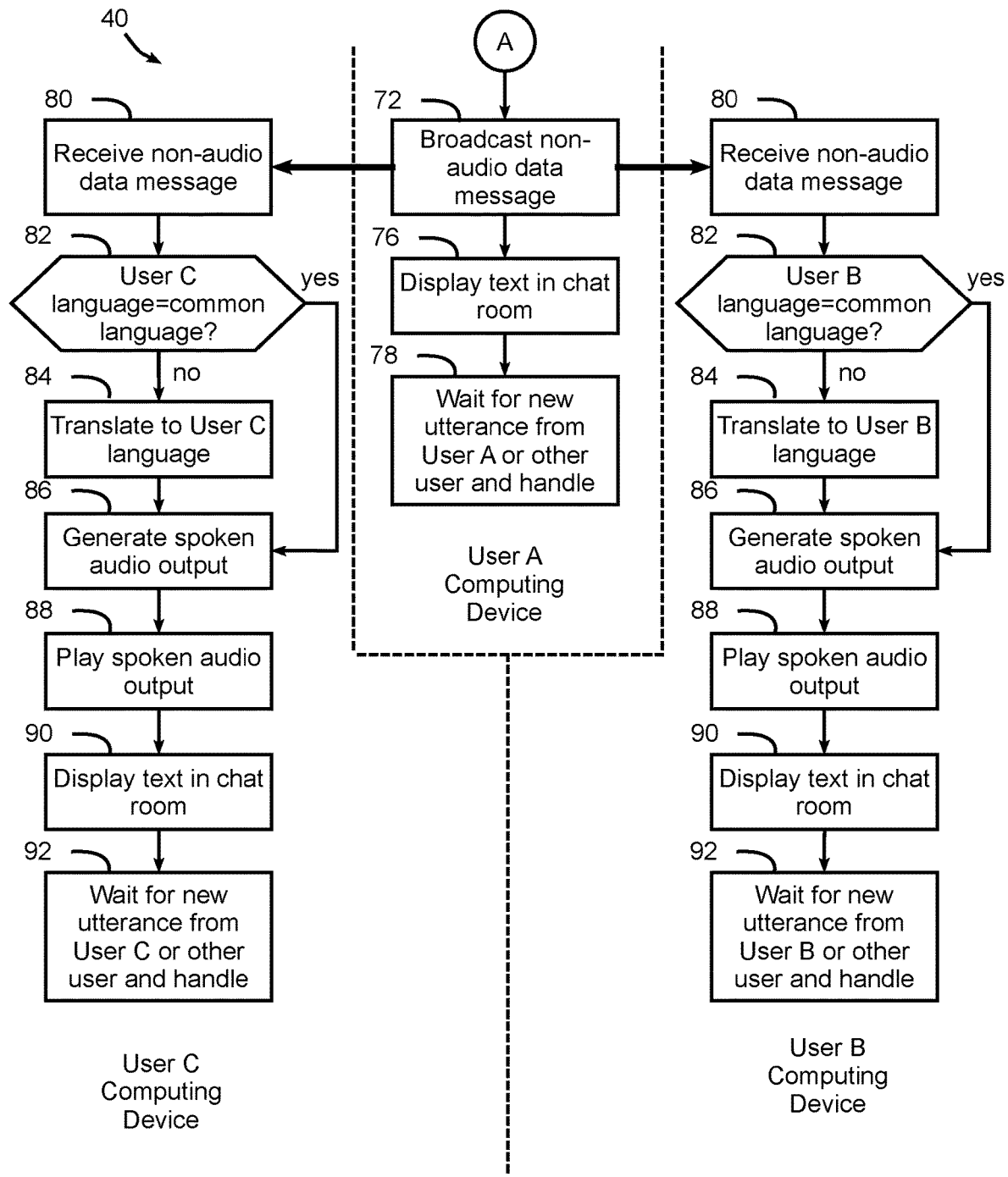

Now turning to FIGS. 2A-2B, an example routine 40 for implementing low latency nearby group translation in the environment of FIG. 1 is illustrated. Routine 40 illustrates operations performed by the computing devices of three users, Users A, B and C. Furthermore, for the purpose of placing the routine in context, an example tour guide application is discussed, where User A is a tour guide Margaux who speaks French, User B is a tour participant Jim who speaks English, and User C is a tour participant Diego who speaks Spanish. It will be appreciated that routine 40 may be used in other applications, so the invention is not limited to the particular application discussed hereinafter.

Routine 40 begins in block 42 by User A requesting to create a multi-language translation group on the user's computing device, resulting in the creation of the group by the User A computing device. A multi-language translation group, in this regard, may be considered to be a logical entity that associates at least a set of user computing devices with one another for the purposes of group communications between users speaking in three or more different languages to enable a communication issued by one user in one language to be communicated to the computing devices of the other users in the group and translated into multiple different languages for those different users. Communications via a multi-language translation group may therefore include in some implementations the communication of data between computing devices associated with the multi-language translation group using information stored for the multi-language translation group to assist with routing communications between computing devices associated with the group.

Next, in block 44, the User A computing device broadcasts an announcement message, which is received by each of the User B and User C computing devices as represented in blocks 46 and 48. The broadcast of an announcement may be, for example, a Bluetooth LE pairing request where the computing devices interact through a Bluetooth network, although it will be appreciated that for other network protocols, other forms of announcements may be used. It will also be appreciated that other computing devices may initiate announcement messages, and in some implementations, no announcements may be used.

Next, as illustrated in blocks 50-60, the User A computing device adds each of User B and User C to the multi-language translation group. It will be appreciated that order in which the users are added is arbitrary, and that additional users may also be added to the multi-translation translation group in a similar manner. For User B, the User A and User B computing devices in blocks 50 and 52 negotiate a network connection between one another, and the User A computing device in block 54 adds User B to the multi-language translation group. For User C, the User A and User C computing devices in blocks 56 and 58 negotiate a network connection between one another, and the User A computing device in block 60 adds User C to the multi-language translation group. Negotiating a network connection in blocks 50-52 and 56-58 may be performed in various manners suitable for the particular local wireless network utilized, e.g., using a Bluetooth negotiation protocol for a Bluetooth network, and it will be appreciated that various information may be exchanged during such a negotiation, e.g., a user name, network information (e.g., an IP address, Bluetooth address, MAC address, etc.), and optionally, the user's native, selected or desired language. Adding a user to the multi-language translation group in blocks 54 and 60 may include adding an entry to a data structure for the multi-language translation group (e.g., as discussed below in connection with FIG. 4), such that future communications may be directed to all members of the group.

Blocks 62-92 then represents the handling of a group communication from User A to the multi-language translation group that includes at least Users B and C. It will be assumed that for the purposes of this example, English is the common language used to communicate non-audio spoken utterances between users, although the invention is not so limited.

In block 62, the User A computing device receives a speech input (e.g., a spoken utterance) from User A, e.g., via a microphone capture from the User A computing device or from a headset, earbud, headphone, earphone, etc. in communication with the User A computing device. In block 64, the User A computing device performs automated speech recognition on the speech input, e.g., in the User A language. In block 66, the User A computing device then determines if the User A language is the common language (e.g., is English), and if not, passes control to block 68 to perform a translation from the User A language to the common language, and to block 70 to generate a set of non-audio data in the common language and representative of the speech input. If the User A language is the common language, however, the User A computing device in block 66 bypasses block 68 and passes control to block 70 to generate a set of non-audio data in the common language.

The non-audio data, for example, may be formatted as text in some implementations, while in other implementations, other formats may be used, e.g., embedded or feature vectors usable by machine learning components for performing any or all of speech recognition, language translation and text-to-speech conversion. It will also be appreciated that various data formats may be used to pass various representations of a speech input through automated speech recognition and language translation. In one implementation, for example, automated speech recognition may generate text in the User A language, and language translation may convert this generated text into translated text in the common language.

Now turning to FIG. 2B, control passes to block 72 where the User A computing device broadcasts a message containing the non-audio data to each of the User B and User C computing devices. The User A computing device may then display a textual representation of the speech input in the User A language in a chat room displayed on the User A computing device (block 76), and the User A computing device may then wait in block 78 for a new utterance to be spoken by User A or for a message representing a new utterance spoken by another member of the group to be received, and to handle the utterance in the manner discussed herein.

In each of the User B and User C computing devices, the message broadcast by the User A computing device in block 72 is handled in the manner illustrated in blocks 80-92. In block 80, the message from the User A computing device is received, and in block 82 the User B or User C computing device makes a determination as to whether the selected language for the user of the computing device is the common language. If not, the User B or User C computing device in block 82 passes control to block 84 to translate the non-audio data in the message from the common language to the user's selected language, and to block 86 to generate a spoken audio output in the user's selected language (e.g., using a text-to-speech component). If the two languages are the same, however, the User B or User C computing device in block 82 bypasses block 84 and passes control directly to block 86.

Next, the User B or User C computing device in block 88 plays back the spoken audio output, e.g., over a speaker of the computing device or a speaker in an earbud, external speaker, headset, headphones, earphones, etc. coupled to the user's computing device. The User B or User C computing device in block 90 then displays a textual representation of the speech input in the user's selected language in a chat room displayed on the user's computing device. The User B or User C computing device may then wait in block 92 for a new utterance to be spoken by the user of the device (which is handled by the user's computing device in the manner described above in connection with blocks 62-76), or for a message representing a new utterance spoken by another member of the group to be received (which is handled by the user's computing device in the manner described above in connection with blocks 80-90).

With continuing reference to blocks 76 and 90, FIGS. 3A-3D illustrate chat room displays of an example interaction between Users A, B and C. FIG. 3A, for example, illustrates an example computing device 100 for User B (Jim, who speaks English) including a display 102 in which is displayed a group translate application window 104. A field 106 displays a list of group members, Margaux, Diego and Jim, and a transcript of utterances in English are displayed in elements 108, 110 and 112, along with an indication of the speaker of each utterance, and optionally, an indication of that speaker's selected language.

User interface 102 also includes a "speak" control 114 that User B may activate in order to create a spoken utterance for communication to the rest of the group. In addition, in some implementations, private communications to individual group members may also be supported, e.g., by selecting "private" control 116.

Assume, for the purposes of the example, that User B wishes to communicate to the group. The user selects control 114 and speaks the utterance "In what year did he die?" into the device. As shown in FIG. 3B, as a result of speaking the utterance, the User B device displays a textual representation of the spoken utterance in element 118.

FIG. 3C illustrates an example computing device 120 for User A (Margaux, the tour guide, who speaks French), including a display 122 in which is displayed a group translate application window 124. A field 126 displays a list of group members, Margaux, Diego and Jim, and a transcript of utterances in French are displayed in elements 130, 132 and 138, corresponding respectively to the English elements 110, 112 and 118 in FIGS. 3A-3B, along with an indication of the speaker of each utterance, and optionally, an indication of that speaker's selected language.

User interface 122 also includes a "speak" control 134 that User A may activate in order to create a spoken utterance for communication to the rest of the group. In addition, in some implementations, individual "play back" controls 136 may be displayed in association with each communication 130, 132, 138 to enable the user to re-listen to the spoken audio output if desired. FIG. 3C also illustrates another optional control 140 that may be displayed in user interface 122 to enable User A to create and/or communicate to the group or more prestored messages. Selection of control 140 may result, for example, in a display similar to that illustrated in FIG. 3D, whereby a pop-up window 142 may display controls 144, 146 and 148 that User A may select to communicate non-audio data associated with each prestored message to the other members of the group, thereby enabling each user to translate (if needed) and play back a spoken audio output corresponding to the prestored message in his or her selected language.

It will be appreciated that while in the example displays of FIGS. 3A-3D, a user initiates a speech input by selecting a "speak" control, in other implementations speech input may be captured in other manners, e.g., using an "always on" mode where the computing device captures all spoken input by a user, based upon depression of a hard button on a computing device, or based upon speaking a voice-activated command phrase similar to the phrases used to activate personal assistants on some types of computing devices.

Figure 4:
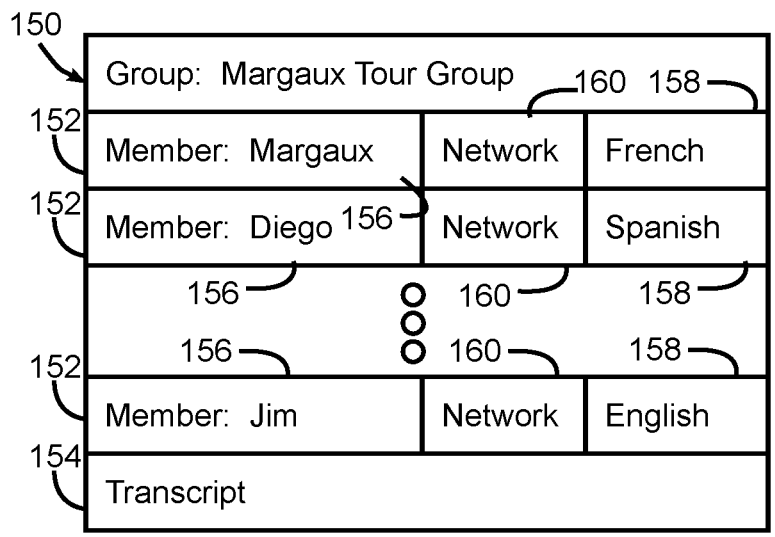
FIG. 4 depicts one example of a translation group data structure, in accordance with various implementations.

Now turning to FIG. 4, a number of different data structures may be used to maintain group information for a multi-language translation group in various implementations. FIG. 4 in particular illustrates a translation group data structure 150 for a group "Margaux tour group," which may include multiple records or entries 152 for each member of the group, and which may be maintained on each user computing device. As new members are added to the group, new entries 152 are added to data structure 150. In addition, a transcript 154 may be maintained for the group, including each communication or spoken utterance issued to the group.

Each entry 152 may include, for its respective member, a user name field 156 or other user identification information, and optionally a language field 158 representing the selected language of the associated user. In some implementations, no language information may be stored, as each user may receive all communications in a common language.

Each entry 152 may also include a network field 160 storing network information for each user, thereby enabling communications to be communicated to the other user computing devices.

It will be appreciated, however, that data structures other than that illustrated in FIG. 4 may be used in other implementations, so the invention is not so limited.

Figure 5:
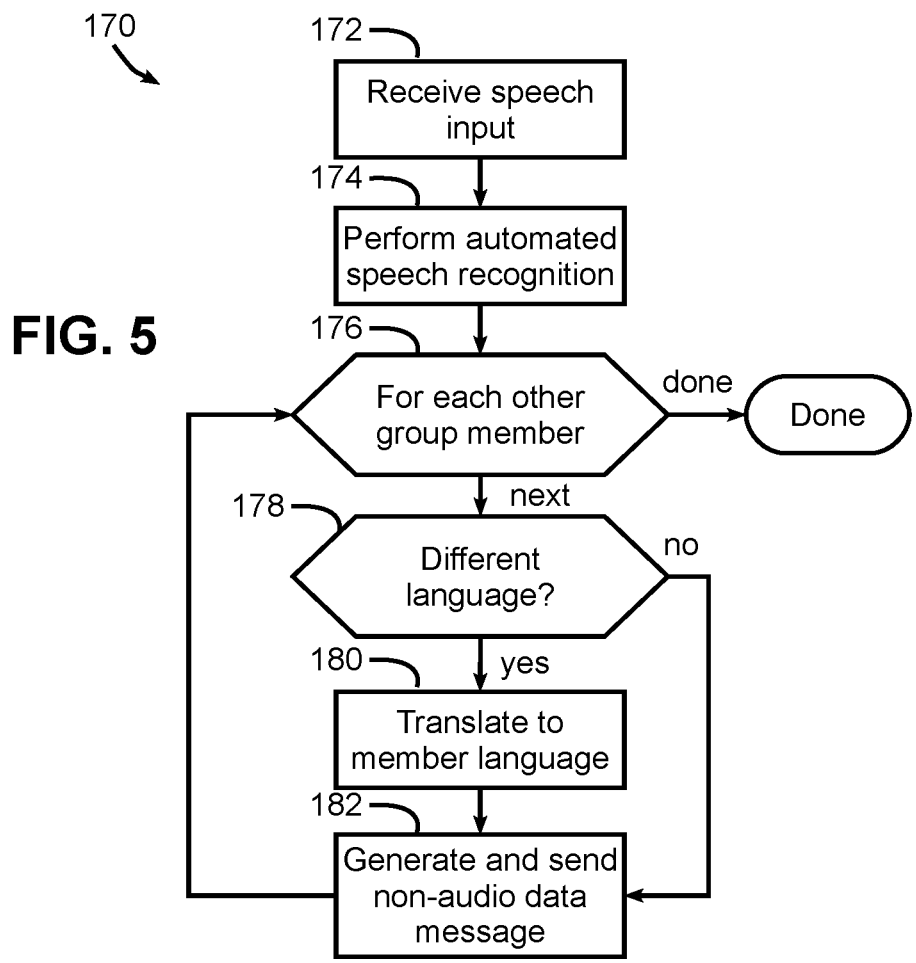
FIG. 5 depicts a flow chart illustrating another example method in accordance with various implementations.

FIG. 5 next illustrates an alternate implementation where, rather than sending a broadcast message to all other group members including non-audio data in a common language, a sending computing device may send individual messages to other group members including non-audio data in the selected language for each user. FIG. 5 in particular illustrates a routine 170 that begins in block 172 by receiving in a sending computing device a speech input from the computing device user. In block 174, automated speech recognition is performed in the sending computing device to generate a non-audio (e.g., text) representation of the speech input in the user's selected language. The sending computing device in block 176 then initiates a loop that sends a message to each other group member. For each such member, the sending computing device in block 178 determines if the member has selected a different language from that of the sending user (e.g., based upon the language data stored in data structure 150), and if not, passes control to block 180 to perform a translation to the language selected by the member. The sending computing device in block 182 then generates and sends a message addressed to that member's computing device including non-audio data in the member's language and addressed to the member's computing device. If the languages are not different, however, block 180 is bypassed, and block 178 passes control directly to block 182 to generate and send a message to the member. Once messages have been sent to all other members, routine 170 is complete.

Routine 170 may also be varied in other implementations. For example, rather than sending individual messages to each member, messages may be generated for each language represented in the group and sent to the members for which the language is selected, thereby reducing bandwidth and reducing translation overhead for the sending device. In other implementations, a single broadcast message may be generated including non-audio representations of each of the represented languages, such that each member computing device receiving the message can select the non-audio data in the language selected by the member.

In still other implementations, one or more of automated speech recognition, translation and text-to-speech conversion may be performed by a cloud service rather than locally within a computing device. On the other hand, performing these actions locally and using the local computing resources of a computing device may be desirable in some implementations in order to reduce latency and bandwidth consumption by a computing device, as well as to reduce a computing device's dependence upon online connectivity to a cloud service, which might otherwise limit use of group translation in locations having little or no online connectivity.

Also, in some implementations, it may be desirable to use multiple wireless networks to implement group translation. For example, where multiple network types are supported, different computing devices may connect to one another using different network connections. Further, it may be desirable in some implementations to use one type of network to establish a multi-language translation group, and then use a different type of network to communicate data associated with speech inputs between different computing devices. Thus, for example, in one example implementation, a Bluetooth, NFC or other short-distance network may be used to establish a multi-language translation group, and in the course of establishing the group, network information associated with another network, e.g., an IP address for each computing device, may be gathered and distributed among the group members, such that future communications between the group members (e.g., non-audio data associated with spoken utterances) may be conducted over the other type of network (e.g., over Wi-Fi).

Figure 6:
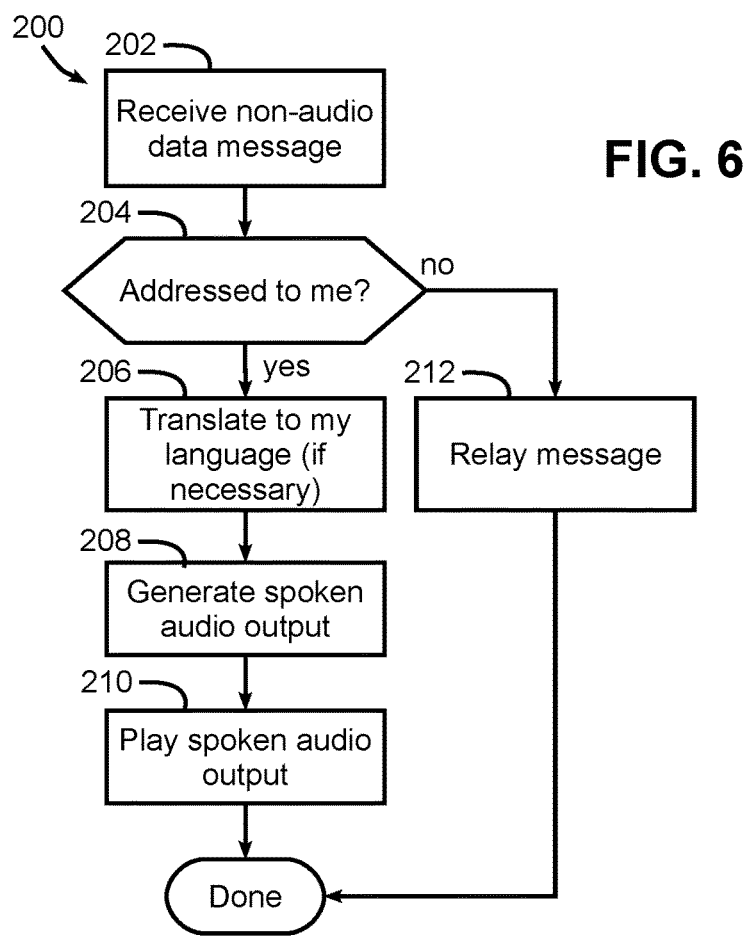
FIG. 6 depicts a flow chart illustrating yet another example method in accordance with various implementations.

FIG. 6 next illustrates yet another implementation, and in particular a routine 200 that may be executed by each computing device to receive and handle non-audio data messages sent by other members of a multi-language translation group. In this implementation, a mesh network topology is used, whereby rather than establishing point-to-point connections between all member computing devices, member computing devices are used to relay messages to other member computing devices when no point-to-point connections exist between sending and receiving devices. Thus, routine 200 may begin in block 202 by receiving at a receiving computing device a non-audio data message from a sending computing device. The receiving computing device in block 204 then determines if the received message is addressed to this computing device, and if so, control is passed to blocks 206-210 to process the received message, including by the receiving computing device translating the non-audio data to the user's selected language (block 206), generating the spoken audio output corresponding to the speech input in the user's selected language (block 208) and playing the spoken audio output (block 210).

If, on the other hand, the non-audio data message is not addressed to the user's computing device, the receiving computing device in block 204 passes control to block 212 to relay the message on to another computing device and thereby propagate the message through the mesh network until the message is received by its intended destination computing device.

It will therefore be appreciated that various implementations may provide various technical advantages over existing approaches. Through the use of a common language, and the communication of non-audio data in the common language between speaker and listener computing devices, translation operations are distributed among the speaker and listener computing devices, and no computing device is generally required to perform multiple translations for a given spoken utterance. Doing so may reduce latency, processing overhead, and power consumption in each computing device. In addition, by communicating non-audio data instead of audio data, the amount of data that is required to be communicated between devices may be reduced. This may help to reduce the latency associated with operation of the multi-language translation group and/or may avoid any loss of quality that is often associated with the wireless transmission of audio data. Furthermore, by performing automated speech recognition, translation and text-to-speech conversion locally within individual computing devices, both latency and dependency on online connectivity are reduced. Furthermore, the nearby nature of the local wireless networks that may be used to establish a multi-language translation group may facilitate group establishment in situations where multiple individuals in the same location wish to participate in such a group, and moreover, scalability in terms of numbers of users and numbers of supported languages is high due to the fact that in many implementations each computing device is responsible only for translating between at most a single language selected by the user and a common language (and no translation at all if the user happens to speak the common language). Adding another group member who speaks a different language from every other group member generally does not alter the processing and bandwidth overhead or latency for any individual computing device participating in the multi-language translation group in many implementations.

Further, while the implementations discussed herein focus on a tour guide application, the invention has applicability in numerous other situations, e.g., to support announcements in areas where multiple individuals speaking different languages may be in the same location, e.g., on an airplane, bus, ship or train, in a train terminal or airport, at a presentation or conference, at a large assembly such as the United Nations, at sporting or electronic gaming events, etc. Further, in situations where individuals speaking more than two languages are in the same location, implementations discussed herein may facilitate communication between those individuals, e.g., at cocktail parties, receptions, business meetings, restaurants, etc.

It may also be desirable in some implementations to also incorporate virtual assistant functionality into a group translation app, e.g., within a chat room for a multi-language translation group. Thus, for example, rather than the initial speech input to be communicated as non-audio data and translated as needed by each computing device being either spoken by the user of the sending computing device or provided as a prestored message, the initial speech input may be an audio or non-audio message generated by a virtual assistant. The speech input may be generated, for example, automatically in response to a virtual assistant detecting a message that poses a question that could be answered by the virtual assistant, or manually in response to a dedicated request to a virtual assistant. Thus, for example, in response to the message "In what year did he die?" created by Jim in the example discussed above in connection with FIG. 3B and illustrated in element 118, a virtual assistant either in Jim's computing device or in another computing device (e.g., Margaux the tour guide's computing device) may detect that a query has been posed by a group member, and may generate a response such as "Leonardo da Vinci died in 1519" either as text or as spoken audio, and may result in the generation of a non-audio message similar to that generated in block 70 of routine 40 (and performing any of blocks 62-68 as needed to generate a non-audio representation of the response), which may be processed in blocks 72-92 in the same manner as any other speech input. Thus, each member of the group may receive the response in audio and/or textual format and in his or her selected language. As another alternative, the initiation of a virtual assistant response may be initiated manually, e.g., by selecting a control similar to button 136 on element 138 of FIG. 3C. As yet another alternative, a separate control may be provided on a computing device (e.g., on the tour guide's computing device) to enable the user of that computing device to query the virtual assistant for a response.

Figure 7:
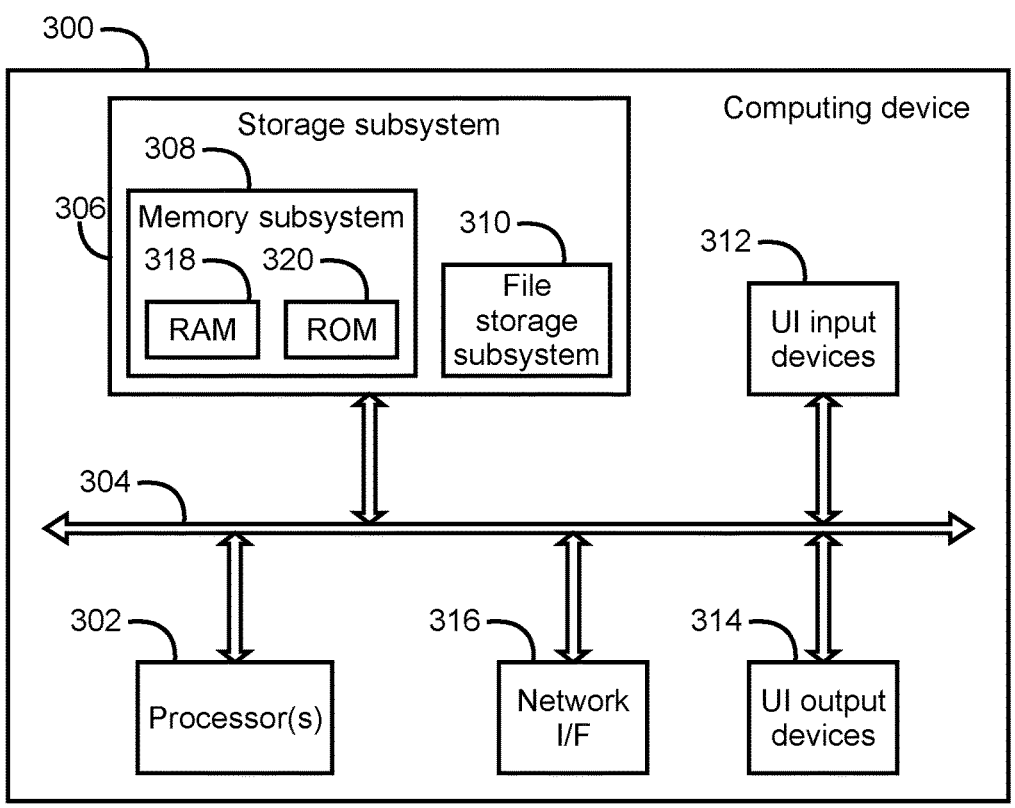
FIG. 7 schematically depicts an example architecture of a computing device.

FIG. 7 is a block diagram of an example computing device 300. Computing device 300 typically includes at least one processor 302 that communicates with a number of peripheral devices via bus subsystem 304. These peripheral devices may include a storage subsystem 306, including, for example, a memory subsystem 308 and a file storage subsystem 310, user interface input devices 312, user interface output devices 314, and a network interface subsystem 316. The input and output devices allow user interaction with computing device 300. Network interface subsystem 316 provides an interface to outside networks and is coupled to corresponding interface devices in other computing devices.

User interface input devices 312 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 300 or onto a communication network.

User interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 300 to the user or to another machine or computing device.

Storage subsystem 306 stores programming and data constructs that provide the functionality of some or all of the modules described herein. For example, the storage subsystem 306 may include the logic to perform selected aspects of routine 40 of FIGS. 2A-2B, and/or to implement one or more of group translation app 18, networking component 20, chat component 22, translation component 24, automated speech recognition component 26 and text-to-speech component 28. of FIG. 1.

These software modules are generally executed by processor 302 alone or in combination with other processors. Memory 308 used in the storage subsystem 306 can include a number of memories including a main random access memory (RAM) 318 for storage of instructions and data during program execution and a read only memory (ROM) 320 in which fixed instructions are stored. A file storage subsystem 310 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 310 in the storage subsystem 306, or in other machines accessible by the processor(s) 302.

Bus subsystem 304 provides a mechanism for enabling the various components and subsystems of computing device 300 to communicate with each other as intended. Although bus subsystem 304 is shown schematically as a single bus, alternative implementations of the bus subsystem may use multiple busses.

Computing device 300 can be of varying types including a mobile device, a smartphone, a tablet, a laptop computer, a desktop computer, a wearable computer, a programmable electronic device, a set top box, a workstation, a server, a computing cluster, a blade server, a server farm, or any other data processing system or computing device. Due to the ever-changing nature of computers and networks, the description of computing device 300 depicted in FIG. 7 is intended only as a specific example for purposes of illustrating some implementations. Many other configurations of computing device 300 are possible having more or fewer components than computing device 300 depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method of group translation, comprising:
   in a first computing device of a first user and configured to output spoken audio in a first language, joining a multi-language translation group additionally including second and third users by establishing a local wireless network connection to one or both of a second computing device of the second user and a third computing device of the third user, wherein the second and third computing devices are respectively configured to output spoken audio in second and third languages, and wherein the first, second and third languages differ from one another;
   in the first computing device, and in response to a speech input in the second language received at the second computing device and directed to the multi-language translation group:
      receiving non-audio data associated with the speech input; and
      generating a spoken audio output in the first language and directed to the first user from the non-audio data associated with the speech input, wherein generating the spoken audio output in the first computing device includes locally translating the non-audio data associated with the speech input to the first language; and
   in the first computing device, and in response to a second speech input in the first language received from the first user at the first computing device:
      receiving the second speech input from the first user;
      performing automated speech recognition on the second speech input and locally translating an output of the automated speech recognition from the first language to a different language to generate second non-audio data associated with the second speech input; and
      sending the second non-audio data associated with the second speech input to the second and third computing devices via the multi-language translation group to cause at least one of the second computing device to locally generate a translation of the second non-audio data into the second language and the third computing device to locally generate a translation of the second non-audio data into the third language.

2. The method of claim 1, further comprising, in the third computing device and in response to the speech input in the second language received at the second computing device and directed to the multi-language translation group:
   receiving the non-audio data associated with the speech input; and
   generating a second spoken audio output in the third language and directed to the third user from the non-audio data associated with the speech input.

3. The method of claim 1, further comprising, in the second computing device:
   receiving the speech input;
   performing automated speech recognition on the speech input to generate the non-audio data associated with the speech input; and
   sending the non-audio data associated with the speech input to the first and third computing devices via the multi-language translation group.

4. The method of claim 1, further comprising, in the second computing device:
   receiving the speech input;
   performing automated speech recognition on the speech input and locally translating an output of the automated speech recognition from the second language to a different language to generate the non-audio data associated with the speech input; and
   sending non-audio data associated with the speech input to the first and third computing devices via the multi-language translation group.

5. The method of claim 1, wherein the non-audio data comprises one or more feature vectors describing the phonemes, words or phrases in the speech input.

6. The method of claim 1, further comprising, in the first computing device:
   receiving a second speech input from the first user;
   performing automated speech recognition on the second speech input to generate second non-audio data associated with the second speech input; and
   sending the second non-audio data associated with the second speech input to the second and third computing devices via the multi-language translation group.

7. The method of claim 1, wherein the non-audio data comprises text data in a common language different from the first and third languages.

8. The method of claim 1, wherein the non-audio data associated with the speech input comprises text data associated with the speech input.

9. The method of claim 1, wherein the non-audio data associated with the speech input comprises one or more feature vectors associated with the speech input.

10. The method of claim 1, wherein the local wireless network connection comprises a Bluetooth connection, a personal area network connection, a wireless mesh network connection, a near field connection (NFC), or a wireless local area network (WLAN) connection.

11. The method of claim 1, wherein the local wireless connection uses a first wireless network, wherein joining the multi-language translation group is performed over the first wireless network and receiving the non-audio data associated with the speech input is performed over a second wireless network.

12. The method of claim 1, further comprising, in the first computing device, relaying the non-audio data associated with the speech input and received from the second computing device to the third computing device.

13. The method of claim 1, wherein the non-audio data associated with the speech input is received in a broadcast message generated by the second computing device.

14. The method of claim 1, wherein the non-audio data associated with the speech input is received in a point-to-point message generated by the second computing device and addressed to the first computing device.

15. The method of claim 1, further comprising initiating the multi-language translation group by:
broadcasting an announcement message from one of the first and second computing devices; and
receiving, at the one of the first and second computing devices, a response to the announcement message from the other of the first and second computing devices.

16. The method of claim 1, wherein the first computing device includes a mobile device, and wherein joining the multi-language translation group, receiving the non-audio data associated with the speech input and generating the spoken audio output are performed by an app resident on the mobile device.

17. The method of claim 16, wherein the first computing device further includes a wireless headphone in wireless communication with the mobile device, the method further comprising playing back the spoken audio output over the wireless headphone.

18. The method of claim 16, wherein the app generates a chat room display on a display of the mobile device, the method further comprising displaying a textual representation of the spoken audio output in the first language in the chat room display.

19. A computer-implemented method of group translation, comprising:
in a first computing device of a first user and configured to output spoken audio in a first language, joining a multi-language translation group additionally including second and third users by establishing a local wireless network connection to one or both of a second computing device of the second user and a third computing device of the third user, wherein the second and third computing devices are respectively configured to output spoken audio in second and third languages, and wherein the first, second and third languages differ from one another; and
in the first computing device:
receiving a speech input in the first language from the first user;
performing automated speech recognition on the speech input and locally translating an output of the automated speech recognition from the first language to a different language to generate non-audio data associated with the second speech input; and
sending the non-audio data associated with the speech input to the second and third computing devices via the multi-language translation group to cause at least one of the second and third computing devices to locally translate the non-audio data into one of the second and third languages and generate respective spoken audio outputs in the second and third languages and respectively directed to the second and third users.

20. A first computing device configured to output spoken audio in a first language to a first user and comprising one or more processors and memory operably coupled with the one or more processors, wherein the memory stores instructions that, in response to execution of the instructions by the one or more processors, cause the one or more processors to:
join a multi-language translation group additionally including second and third users by establishing a local wireless network connection to one or both of a second computing device of the second user and a third computing device of the third user, wherein the second and third computing devices are respectively configured to output spoken audio in second and third languages, and wherein the first, second and third languages differ from one another;
in response to a speech input in the second language received at the second computing device and directed to the multi-language translation group:
receive non-audio data associated with the speech input; and
generate a spoken audio output in the first language and directed to the first user from the non-audio data associated with the speech input, wherein the first computing device is configured to generate the spoken audio output by locally translating the non-audio data associated with the speech input to the first language; and
in response to a second speech input in the first language received from the first user at the first computing device:
receive the second speech input from the first user;
perform automated speech recognition on the second speech input and locally translate an output of the automated speech recognition from the first language to a different language to generate second non-audio data associated with the second speech input; and
send the second non-audio data associated with the second speech input to the second and third computing devices via the multi-language translation group to cause at least one of the second computing device to locally generate a translation of the second non-audio data into the second language and the third computing device to locally generate a translation of the second non-audio data into the third language.

* * * * *